United States Patent [19]

Kurihara et al.

[11] Patent Number: 5,907,383

[45] Date of Patent: May 25, 1999

[54] METHOD FOR PRODUCING A LIQUID CRYSTAL DISPLAY DEVICE

[75] Inventors: Takashi Kurihara, Tenri; Yasuhiro Kume, Nara; Kenji Majima, Matsubara, all of Japan

[73] Assignee: Sharp Kabushiki Kaisha, Osaka, Japan

[21] Appl. No.: 09/037,411

[22] Filed: Mar. 10, 1998

[30] Foreign Application Priority Data

Mar. 11, 1997 [JP] Japan ................................. 9-056739

[51] Int. Cl.⁶ ................................................. G02F 1/1339
[52] U.S. Cl. ........................... 349/191; 349/156; 349/188
[58] Field of Search ................................. 349/92, 93, 94, 349/156, 169, 188, 191; 430/20

[56] References Cited

U.S. PATENT DOCUMENTS

| | | | |
|---|---|---|---|
| 5,473,450 | 12/1995 | Yamada | 359/51 |
| 5,627,665 | 5/1997 | Yamada | 349/156 |
| 5,668,651 | 9/1997 | Yamada et al. | 349/156 |

FOREIGN PATENT DOCUMENTS

| | | |
|---|---|---|
| 8-95012 | 4/1996 | Japan . |
| 8-292423 | 11/1996 | Japan . |

*Primary Examiner*—Hung Xuan Dang
*Assistant Examiner*—Tai V. Duong
*Attorney, Agent, or Firm*—David G. Conlin; George W. Neuner

[57] ABSTRACT

A method for producing a liquid crystal display device including a pair of substrates and a liquid crystal layer held between the pair of substrates, wherein the liquid crystal layer includes a polymeric region and a liquid crystal region substantially surrounded by the polymeric region, and liquid crystal molecules in the liquid crystal region are axis-symmetrically oriented, the method including the steps of: injecting a precursor mixture containing a liquid crystal material and a polymerizable material between the pair of substrates; heating the precursor mixture to a first temperature which is equivalent to or higher than a miscible temperature of the precursor mixture; cooling the precursor mixture from the first temperature to a second temperature which is lower than the miscible temperature; forming the polymeric region substantially surrounding the liquid crystal region by polymerizing the polymerizable material; and providing a tilt angle to the liquid crystal molecules in a liquid crystal droplet phase-separated from the precursor mixture by continuously applying a prescribed external field to the precursor mixture at least while the precursor mixture is being cooled from the miscible temperature to the second temperature

9 Claims, 13 Drawing Sheets

1

METHOD FOR PRODUCING A LIQUID CRYSTAL DISPLAY DEVICE

BACKGROUND OF THE INVENTION

1. Field of the Invention

The present invention relates to a method for producing a liquid crystal display device having a flat display, such as a portable information terminal, a personal computer, a word processor, an amusement apparatus, and a television set usable by a large number of people, and a liquid crystal display device used for a display board utilizing a shutter effect, a window, a door, a wall, and the like.

1. Description of the Related Art

Japanese Laid-Open Publication No. 6-301015 (U.S. Pat. No. 5,473,450) discloses a liquid crystal display device 100 (FIG. 13) having viewing angle characteristics remarkably improved by orienting liquid crystal molecules axis-symmetrically (e.g., radially, concentrically, or the like).

A partial cross section of the conventional liquid crystal display device 100 is shown schematically in FIG. 13. In the liquid crystal display device 100, a liquid crystal layer 27 held between a pair of substrates 21 and 23 includes a polymeric region 28 and a liquid crystal region 29 substantially surrounded by the polymeric region 28. The liquid crystal region 29 is formed so as to correspond to a pixel defined by an area between each electrode 22 and a portion of electrode 24 opposed to each electrode 22. Liquid crystal molecules (not shown) in the liquid crystal region 29 are oriented axis-symmetrically with respect to a center axis of the liquid crystal region 29 which is perpendicular to the substrates 21 and 23. As a result, the liquid crystal display device 100 has wide viewing angle characteristics.

A conventional method for producing the liquid crystal display device 100 requires a five-step process of manipulating temperature and voltage shown in FIGS. 7A and 7B in order to axis-symmetrically orient the liquid crystal molecules in a pixel region 25 surrounded by the polymeric region 28. The five steps will be described below.

(1) A step of maintaining a precursor mixture containing a liquid crystal material and a polymerizable material at a temperature at which the precursor mixture enters an isotropic phase (time 0–t1 in FIG. 7A). The temperature is equivalent to or higher than the miscible temperature of the precursor mixture. A pixel of the liquid crystal display device 100 is observed with a polarizing microscope from a direction perpendicular to a display surface (i.e. substrate 21 and 23; a crossed-Nicols state). The state of the pixel in this step is shown in FIG. 8A. The entire pixel is in an isotropic phase 10. The isotropic phase 10 is observed as a dark viewfield, but shown as a white viewfield in FIGS. 8A, 8B, 8C, 8D and 8E for the sake of clarity.

(2) A step of gradually cooling and maintaining the precursor mixture which, in the entirety thereof, is the isotropic phase 10 and is in a miscible state in order to separate a liquid crystal droplet 11a (i.e., liquid crystal phase 11) from the isotropic phase 10 (time t1–t3 in FIG. 7A). The state of the pixel in this step is shown in FIG. 8B. The liquid crystal droplet 11a separates from the isotropic phase 10, and as a result, two phases (that is, the isotropic phase 10 and the liquid crystal phase 11) are generated in the pixel.

(3) A step of raising the temperature of the resultant precursor mixture in which the isotropic phase 10 and the liquid crystal phase 11 exist in order to reduce the size of the liquid crystal droplet 11a to facilitate the axis-symmetrical orientation of the liquid crystal molecules therein (time t3–t4 in FIG. 7A). The state of the pixel in this step is shown in FIG. 8C. Two phases (that is, the isotropic phase 10 and the liquid crystal phase 11) exist in the pixel, and the liquid crystal phase 11 is of a size which would allow the liquid crystal molecules therein to be oriented axis-symmetrically with an application of voltage.

(4) A step of applying a voltage to the precursor mixture while maintaining the size of the liquid crystal droplet 11a obtained in step (3) above in order to cause the liquid crystal molecules in the liquid crystal droplet 11a to be axis-symmetrically oriented (time t4–t5 in FIG. 7A). The state of the pixel in this step is shown in FIG. 8D. Two phases (that is, the isotropic phase 10 and the liquid crystal phase 11) exist in the pixel. The liquid crystal molecules in the liquid crystal droplet 11a are axis-symmetrically oriented, and as a result, an extinction pattern 12 consisting of four (4) portions is observed.

(5) A step of gradually cooling the precursor mixture in order to cause the liquid crystal droplet 11a having the axis-symmetrical orientation to grow (time t5–t6 in FIG. 7A). The state of the pixel in this step is shown in FIG. 8E. The liquid crystal droplet 11a having the axis-symmetrical orientation extends over the entirety of the pixel.

As is described above, in the conventional technology, it is necessary to precisely control the temperature and the timing of a voltage application for axis-symmetrically orienting the liquid crystal molecules in the liquid crystal droplet 11a. The temperature of the precursor mixture must be controlled and maintained so that the temperature allows the liquid crystal droplet 11a to be of a size which facilitates the axis-symmetrical orientation of the liquid crystal molecules therein. A voltage must be applied to the precursor mixture while maintaining this temperature.

SUMMARY OF THE INVENTION

The present invention provides a method for producing a liquid crystal display device including a pair of substrates and a liquid crystal layer held between the pair of substrates, wherein the liquid crystal layer includes a polymeric region and a liquid crystal region substantially surrounded by the polymeric region, and liquid crystal molecules in the liquid crystal region are axis-symmetrically oriented. The method includes the steps of: injecting a precursor mixture containing a liquid crystal material and a polymerizable material between the pair of substrates; heating the precursor mixture to a first temperature which is equivalent to or higher than a miscible temperature of the precursor mixture; cooling the precursor mixture from the first temperature to a second temperature which is lower than the miscible temperature; forming the polymeric region substantially surrounding the liquid crystal region by polymerizing the polymerizable material; and providing a tilt angle to the liquid crystal molecules in a liquid crystal droplet phase-separated from the precursor mixture by continuously applying a prescribed external field to the precursor mixture at least while the precursor mixture is being cooled from the miscible temperature to the second temperature.

In one embodiment of the invention, the pair of substrates include electrodes on opposing surfaces thereof, and the external field is applied to the precursor mixture by applying a voltage across the electrodes.

In one embodiment of the invention, at least one of the pair of substrates includes a projection-like structure surrounding a plurality of pixel regions on a surface which faces the liquid crystal layer, and the method further includes the step of causing the liquid crystal droplet phase-separated from the precursor mixture to aggregate in each of the plurality of pixel regions surrounded by the projection-like structure in the step of cooling.

In one embodiment of the invention, at least one of the pair of substrates further includes an island-like projection in a center portion of each of the plurality of pixel regions on the surface which faces the liquid crystal layer, and the method further includes the step of forming a center axis of an axis-symmetrical orientation of the liquid crystal droplet phase-separated from the precursor mixture at a position corresponding to the island-like projection in the step of cooling.

In one embodiment of the invention, an area occupied by the island-like projection is between 2% and 50% inclusive of the pixel region.

In one embodiment of the invention, the pair of substrates include an electrode for applying a voltage to the liquid crystal layer, at least one of the pair of substrates includes a region with no electrode in the center portion of each of the plurality of pixel regions on the surface which faces the liquid crystal layer, and the method further includes the step of forming a center axis of an axis-symmetrical orientation of the liquid crystal droplet phase-separated from the precursor mixture at a position corresponding to the region with no electrode in the step of cooling.

In one embodiment of the invention, an area occupied by the region with no electrode is between 2% and 50% inclusive of the pixel region.

In one embodiment of the invention, the precursor mixture is cooled at a temperature lowering rate of 5° C./min or lower in the cooling step.

In one embodiment of the invention, the external field applied to the precursor mixture is an AC voltage having a voltage value of 1 V or higher and a frequency of 1 Hz or higher.

Thus, the invention described herein makes possible the advantage of providing a method for producing, in a simple manner with a high level of reproducibility, a liquid crystal display device having a liquid crystal region in which liquid crystal molecules are axis-symmetrically oriented.

This and other advantages of the present invention will become apparent to those skilled in the art upon reading and understanding the following detailed description with reference to the accompanying figures.

DESCRIPTION OF THE PREFERRED EMBODIMENTS

The present invention will be described below by way of illustrative examples with reference to the accompanying drawings.

The term "miscible temperature" refers to a temperature at which a precursor mixture containing a liquid crystal material and a polymerizable material changes from an anisotropic phase to an isotropic phase when the temperature thereof is raised, or a temperature at which the precursor mixture changes from the isotropic phase to the anisotropic phase when the temperature thereof is lowered.

Figure 14:
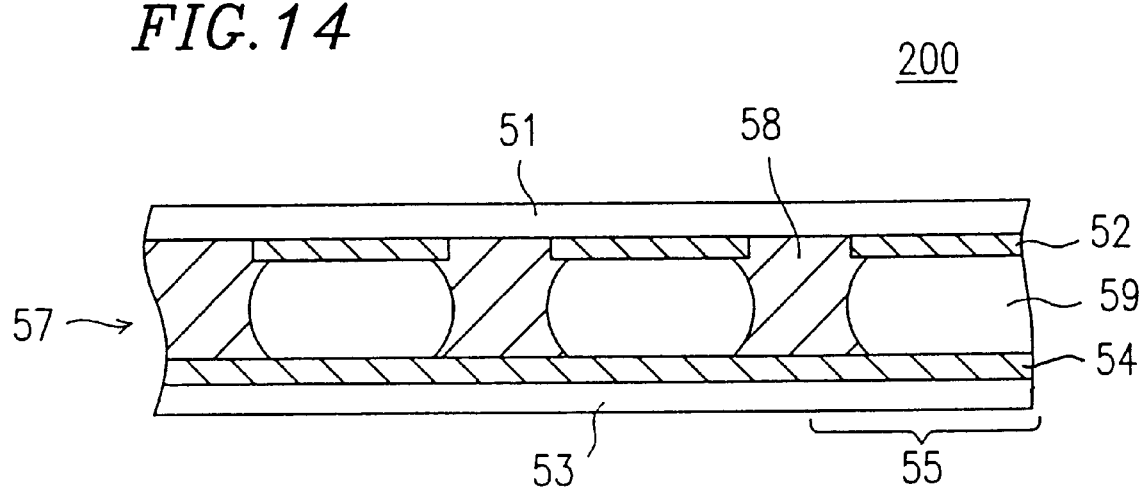
FIG. 14 is partial cross-sectional view of a liquid crystal display device produced by a production method according to the present invention.

As shown in FIG. 14, a liquid crystal display device 200 according to the present invention includes a pair of substrates 51 and 53 opposed to each other, an electrode 54 provided on the substrate 53, an electrode 52 provided in a matrix on the substrate 51, a liquid crystal layer 57 held between the substrates 51 and 53. The liquid crystal layer 57 includes a liquid crystal region 59 and a polymeric region 58. In the liquid crystal display device 200, a liquid crystal region 59 is formed in each pixel region 55, and liquid crystal molecules in the liquid crystal region 59 are axis-symmetrically oriented. Accordingly, the liquid crystal display device 200 has excellent viewing angle characteristics. According to a production method of the present invention, a stable axis-symmetrical orientation can be established in almost all pixel regions 55 (i.e., liquid crystal regions 59). This makes it possible to produce a high yield of liquid crystal display devices of excellent display quality.

It is not necessary, however, to form the liquid crystal region 59 in each pixel region 55. When necessary for a production-related reason, or other reasons, (e.g., in the case of using an elongated pixel which has an aspect ratio other than 1 by 1), one pixel region 55 defined by a black matrix or the like can be divided into two or more regions, and the liquid crystal region 59 may be formed in each of the resultant regions. In this specification, the term "pixel" refers to a basic unit for generating an image in a liquid crystal display device. The term "pixel region" refers to a portion constituting a pixel of a display element in the liquid crystal display device, and includes a liquid crystal region held between a pair of substrates. As described above, a pixel region 55 may include a plurality of liquid crystal regions 59. The liquid crystal regions 59 of the liquid crystal display device 200 according to the present invention have a certain correspondence to the pixels and are arranged in a spatially regular manner.

The liquid crystal layer 57 of the liquid crystal display device 200 is formed by phase-separating a precursor mixture of a liquid crystal material from a polymerizable material as described below. Firstly, the precursor mixture is injected between the pair of substrates 51 and 53, and heated up to a miscible temperature or higher. Secondly, the temperature of the precursor mixture is gradually lowered. This induces the phase-separation of the precursor mixture into a liquid crystal phase and an isotropic phase (i.e., a polymerizable material phase) The liquid crystal phase exists as a plurality of liquid crystal droplets (i.e., an independent phase) in the isotropic phase. This second process is called liquid crystal droplets generation process.

Then, by further lowering the temperature of the precursor mixture, for example, the phase-separation is caused to proceed. As phase-separation proceeds, the liquid crystal droplets grow. This process is called liquid crystal droplets growth process. The plurality of liquid crystal droplets fuse with one another to grow. In this specification, the phrase "growth of liquid crystal droplets" refers to an increase in the size of the liquid crystal droplets. The phrase "size of a liquid crystal droplet" refers to an area occupied by the liquid crystal droplet when viewed perpendicular to the substrates.

According to the production method of the present invention, the liquid crystal droplets generation process and the liquid crystal droplets growth process are performed in the state where a prescribed voltage is applied to the precursor mixture. As a result, liquid crystal molecules in the separated liquid crystal droplets are axis-symmetrically oriented, and the axis-symmetrical orientation is maintained during the growth process. The axis-symmetrical orientation includes a radial, concentric (i.e., tangential) orientations and the like.

When the liquid crystal droplets formed of the axis-symmetrically oriented liquid crystal molecules grow to a prescribed size, the polymerizable material is polymerized, thereby forming a polymeric region 58 to form the liquid crystal region 59 having an axis-symmetrical orientation. In this specification, a liquid crystal phase which exists as an independent phase inside an isotropic phase formed of an unpolymerized polymerizable material is referred to as "liquid crystal droplet", and a liquid crystal droplet substantially surrounded by a polymeric region formed of a polymerized material is referred to as "liquid crystal region". Formation of the polymeric region 58 establishes the phase-separated structure and also the axis-symmetrical orientation of the liquid crystal molecules in the liquid crystal region 59. The use of a photopolymerizable material as the polymerizable material has an advantage in that the photopolymerizable material can be selectively polymerized in a desired region through a use of a photo mask or the like, thereby facilitating a formation of the liquid crystal region 59 (and polymeric region 58) in a spatially regular manner. A transparent electrode and a color filter made of a material which is transmissive to light having a desired wavelength can also act as a photo mask. In such a case, the liquid crystal region 59 can be formed in a self-aligning manner.

It is important that the liquid crystal molecules be tilted at a certain angle (tilt angle) with respect to surfaces of the substrates 51 and 53 so that the axis-symmetrical orientation of the liquid crystal molecules is stabilized during the liquid crystal droplets generation process and the liquid crystal droplets growth process. Stabilization of the axis-symmetrical orientation of the liquid crystal molecules can be achieved by applying a voltage which is higher than a voltage (i.e., threshold voltage) at which the liquid crystal molecules start to rise with respect to the surfaces of the substrates 51 and 53, and is lower than a voltage (i.e., saturation voltage) at which the liquid crystal molecules stand substantially perpendicular to the surfaces of the substrates 51 and 53. The application of such a voltage can be performed through a use of electrodes 52 and 54 for applying a voltage to the liquid crystal layer 57 to achieve display. The voltage to be applied is preferably an AC voltage having a voltage value of 1 V or higher and a frequency of 1 Hz or higher. An application of a DC voltage may deteriorate the precursor mixture. The application of a voltage may be substituted by an application of a magnetic field. Any prescribed external field for tilting the liquid crystal molecules is appropriate.

Figure 9A:
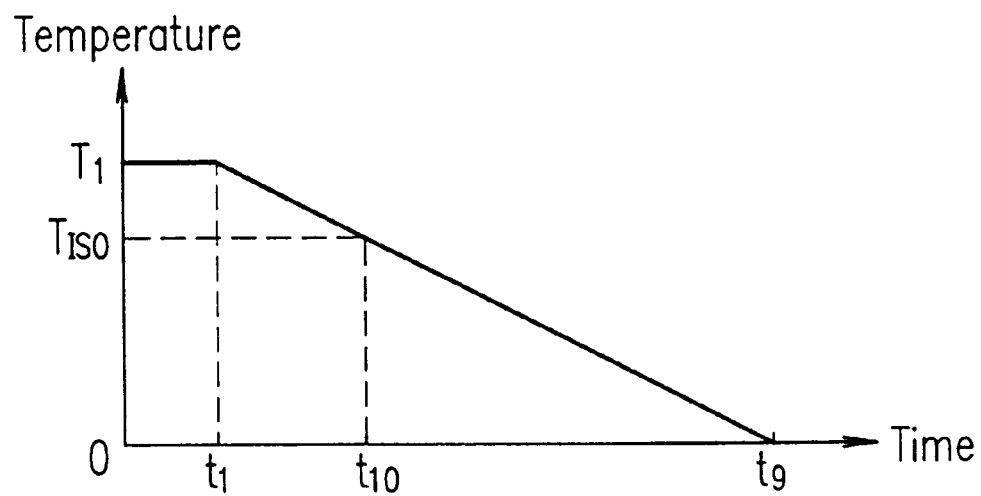
FIG. 9A is a graph illustrating temperature manipulation conditions required by a method for producing a liquid crystal display device according to the present invention.
Figure 9B:
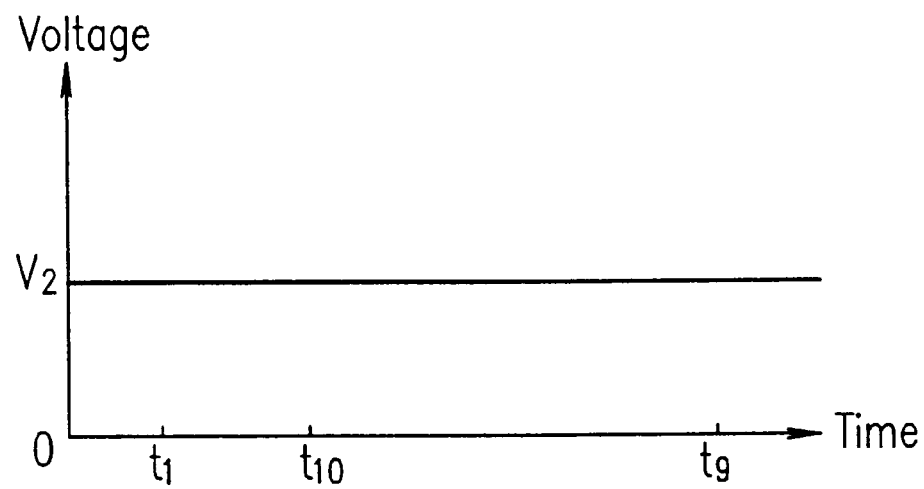
FIG. 9B is a graph illustrating voltage application condition s required by a method for producing a liquid crystal display device according to the present invention.

The method of producing a liquid crystal display device according to the present invention will be described in further detail with reference to FIGS. 9A, 9B, 10A, 10B, 10C, 10D and 10E. As shown in FIGS. 9A and 9B, the production method according to the present invention includes the following two steps for manipulating temperature and voltage.

Figure 10A:
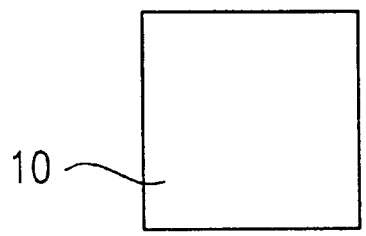
FIG. 10A is a schematic plan view of a pixel in the first stage of a growth process according to a method for producing a liquid crystal display device of the present invention.

(1) A step of maintaining the precursor mixture at a temperature at which the precursor mixture enters an isotropic phase (time 0–t1 in FIG. 9A). The temperature is equal to or higher than the miscible temperature of the precursor mixture. The state of the pixel in this step is shown in FIG. 10A. The whole pixel is in an isotropic phase 10.

Figure 10B:
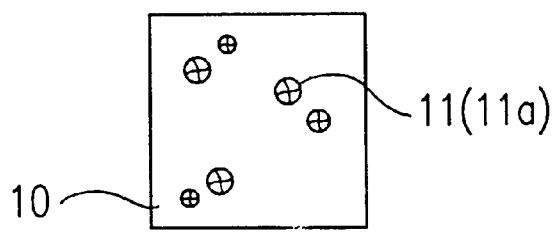
FIG. 10B is a schematic plan view of a pixel in the second stage of a growth process according to a method for producing a liquid crystal display device of the present invention.
Figure 10C:
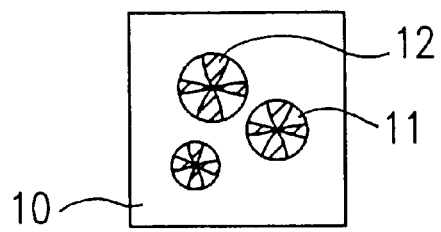
FIG. 10C is a schematic plan view of a pixel in the third stage of a growth process according to a method for producing a liquid crystal display device of the present invention.
Figure 10D:
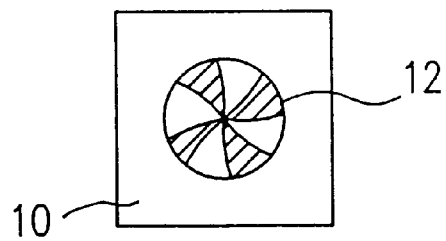
FIG. 10D is a schematic plan view of a pixel in the fourth stage of a growth process according to a method for producing a liquid crystal display device of the present invention.
Figure 10E:
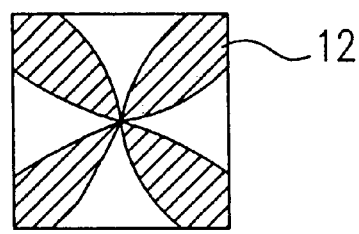
FIG. 10E is a schematic plan view of a pixel in the fifth stage of a growth process according to a method for producing a liquid crystal display device of the present invention.

(2) A step of gradually cooling the precursor mixture which, in the entirety thereof, is in the isotropic phase 10 while applying an AC voltage having a constant amplitude to the precursor mixture (time t1–t9 in FIG. 9A). The state of the pixel in this step is shown in FIGS. 10B, 10C, 10D and 10E. First, liquid crystal droplets 11a in which the liquid crystal molecules are axis-symmetrically oriented separate from the isotropic phase 10 (FIG. 10B). Then, the liquid crystal droplets 11a having the axis-symmetrical orientation fuse with one another to grow (FIG. 10C). The fusion and the growth of the liquid crystal droplets 11a further proceeds until one liquid crystal droplet 11a per pixel is formed (FIG. 10D). Finally, a state where the liquid crystal droplet 11a having axis-symmetrical orientation extends over the entirely of the pixel region 55 is achieved (FIG. 10E). During this step, the liquid crystal molecules are tilted with respect to the surfaces of the substrates 51 and 53 (FIG. 14), and the size of the tilt angle (0<tilt angle<90°) can be controlled by controlling the magnitude of the applied voltage.

As shown in FIGS. 9A and 9B, the method of the present invention includes steps of cooling the precursor mixture monotonously during the period from t1 to t9, and applying an AC voltage having constant amplitude continuously over the period (time=0–t9). The period of the application of voltage is not limited thereto as long as the voltage is applied to the precursor mixture continuously from t10 to t9. It is noted in the present Embodiment that t10 and t9 represent respectively a time at which a temperature of the precursor mixture is the miscible temperature (Tiso) and a time at which an axis-symmetrical orientation of the liquid crystal region 59 is stabilized.

As is shown above, according to the present invention, by simply gradually cooling the precursor mixture from the isotropic temperature while applying a voltage, the liquid crystal droplets 11a having axis-symmetrical orientation are caused to separate from the isotropic phase 10 and grow through fusion, and one liquid crystal droplet 11a having axis-symmetrical orientation and extending over the entirety of the pixel region 55 is obtained.

As is mentioned above, according to the present invention, it is not necessary to precisely control the temperature and the timing of a voltage application for axis-symmetrically orienting the liquid crystal molecules in the liquid crystal droplets 11a.

A magnitude of a voltage to be applied and a frequency are appropriately selected depending on the kind of precursor mixture containing a liquid crystal material and a polymerizable material, the distance between the substrates 51 and 53 (i.e., cell gap), the size of the pixel region 55 (FIG. 14), and the like. A temperature lowering rate is also appropriately selected depending on the kind of precursor mixture, the distance between the substrates 51 and 53, the size of the pixel region 55, and the like. The temperature lowering rate is preferably approximately 5° C./min or lower. The rate higher than approximately 5° C./min causes a disadvantage in that each of the plurality of liquid crystal droplets 11a separating from the precursor mixture in the isotropic, miscible state grows to generate a plurality of symmetry axes within one pixel region 55 before fusing with one another to become a single liquid crystal droplet 11a (i.e., liquid crystal phase 11) in the pixel region 55.

The viewing angle characteristics of the liquid crystal display device 200 can be improved by having a position of the liquid crystal region 59 precisely correspond to that of the pixel region 55. The precise correspondence between these positions requires that a position of the symmetry axis of the axis-symmetrical orientation of the liquid crystal molecules in the pixel region 55 be controlled to be constant throughout the display elements. Given below are some examples of a controlling method.

The position of the symmetry axis can be controlled to be constant by a method using a substrate with a projection-like structure around the pixel region 55. This method utilizes the liquid crystal droplets' property of easily aggregating in a region where a distance between two opposing substrates is large. Alternatively, a method using a substrate with a projection-like structure around the pixel region 55 and a convex portion in a center portion of the pixel region 55 can be adopted. This method makes it possible to arrange a center axis of the axis-symmetrical orientation in a position corresponding to the convex portion existing in the center portion of the pixel region 55. Alternatively, the use of a substrate having a projection-like structure around the pixel region 55 and a region with no electrode in the center of the pixel region 55, also produces a similar effect. By providing the region with no electrode in either one of the pair of electrodes 52 and 54 holding the liquid crystal layer 57 therebetween, in a region corresponding to the center portion of the pixel region 55 an electric field applied to the liquid crystal layer 57 is caused to tilt axis-symmetrically with respect to the normal of substrates 51 and 53 in the center portion of the pixel region 55. This forms a center axis of the axis-symmetrical orientation in the center portion of the pixel region 55 (i.e., a region corresponding to the region with no electrode; see FIG. 11).

The convex portion and the region with no electrode are both formed inside the pixel region 55. Accordingly, an excessively large convex portion or an excessively large region with no electrode deteriorates the display quality. Preferably, the area of the convex portion or that of the region with no electrode (the area when viewed perpendicular to the substrates) is between 2% and 50% inclusive of that of the pixel region 55. If the area of the convex portion or the region with no electrode is less than 2%, the above-mentioned effect may not be fully achieved. The height of the convex portion is desirably between 10% and 90% of a distance between the substrates. A height which is less than 10% or more than 90% almost eliminates the effect of forming the center axis of the axis-symmetrical orientation in the position corresponding to the convex portion.

EXAMPLES

Hereinafter, the examples of the present invention will be described. The examples are not intended to limit the scope of the present invention.

Example 1

Figure 1A:
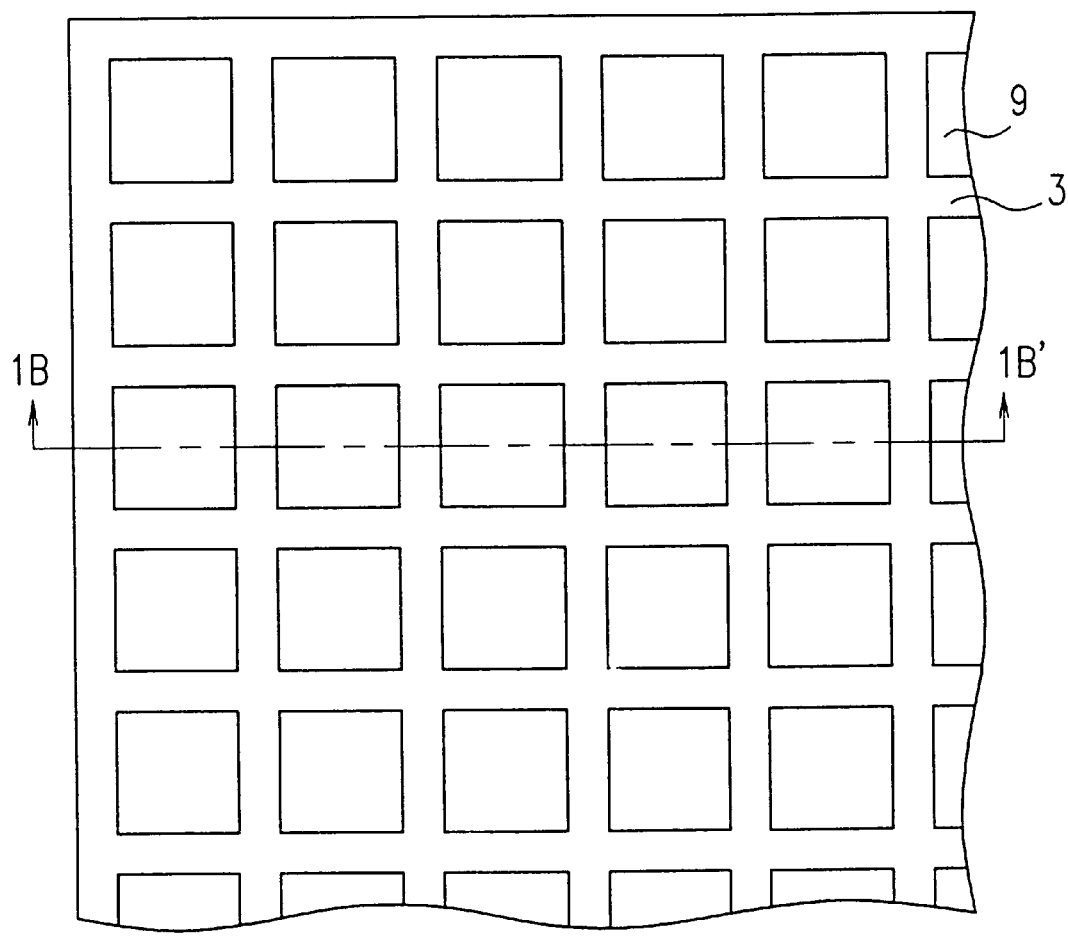
FIG. 1A is a plan view of a substrate in a liquid crystal display device produced in Example 1 according to the present invention.
Figure 1B:
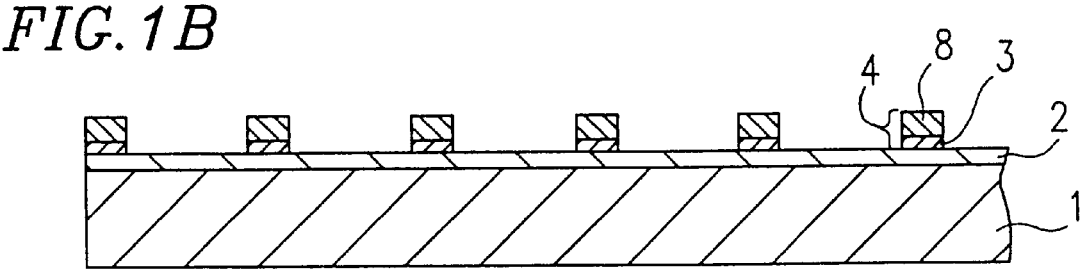
FIG. 1B is a cross-sectional view of the substrate shown in FIG. 1A taken along the line 1B–1B'.

On a glass substrate (thickness: about 1.1 mm) having thereon a transparent electrode (thickness: about 100 nm) formed of ITO (indium-tin-oxide; a mixture of indium oxide and tin oxide), a sealing compound (e.g., STRUCT BOND XN-21S manufactured by MITSUI TOATSU CHEMICALS INC.) is patterned using a printing method to form a first substrate (not shown). Then, as shown in FIGS. 1A and 1B, a black matrix 3 (thickness: 300 nm) which is formed of molybdenum and has an opening 9 (aperture) having a size of about 200 μm×200 μm, is patterned on a glass substrate 1 (thickness: about 1.1 mm) having thereon a transparent electrode 2 formed of ITO (thickness: about 100 nm). To the resultant substrate, a negative-type photoresist (e.g., OMR83 manufactured by Tokyo Ohka Kogyo Co., Ltd.) is applied. The resultant substrate is exposed to light under a prescribed mask, developed, rinsed and baked to form a projection 8 having a height of about 3 μm. Plastic beads having a particle diameter of about 6.0 μm (e.g., Micropearl manufactured by Sekisui Fine Chemical Co., Ltd.) are scattered on the resultant substrate to form a second substrate 210. The second substrate 210 is attached to the first substrate to form a cell. In Example 1, the black matrix 3 and the projection 8 together constitute a projection-like structure 4. The projection-like structure 4 controls a region where liquid crystal droplets are formed to correspond to a region surrounded by the projection-like structure 4 (i.e., opening 9).

As a liquid crystal material, 3.74 g of ZL-4792 (manufactured by Merck & Co., Inc.; containing 0.4 wt % of chiral dopant S-811) is usable. As a polymerizable resin material, a mixture of 0.1 g of R-684 (manufactured by Nippon Kayaku Co., Ltd.), 0.1 g of p-phenylstyrene, and 0.06 g of compound A represented by formula (I) below is usable. As a photopolymerization initiator, 0.02 g of Irgacure 651 (manufactured by Ciba-Geigy Corporation) is usable. The above-mentioned liquid crystal material, polymerizable resin material and photopolymerization initiator are mixed sufficiently to obtain a precursor mixture. The miscible temperature of the precursor mixture is 72° C.

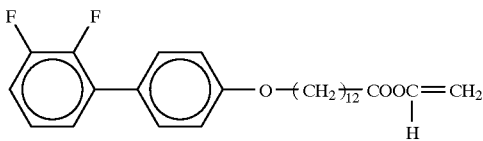

Formula (I)

The precursor mixture is injected into the cell to obtain a liquid crystal cell. The liquid crystal cell is first heated to 100° C. to turn the precursor mixture into a uniform isotropic phase. Then, the temperature is lowered at a temperature lowering rate of 0.3° C./min while applying a square-wave AC signal voltage having a frequency of 60 Hz to the precursor mixture in the liquid crystal cell in order to separate liquid crystal droplets and to cause the separated liquid crystal droplets to grow into one liquid crystal droplet. When a voltage of a small magnitude is applied, a disturbance of the axis-symmetrical orientation of the liquid crystal droplet is observed before the liquid crystal droplet further grows to the size of the pixel region. When a voltage of a large magnitude is applied, the separated liquid crystal droplets fuse with one another after growing to the size of the pixel region. The fusion of the liquid crystal droplets is accompanied by a generation of disclination.

Figure 2:
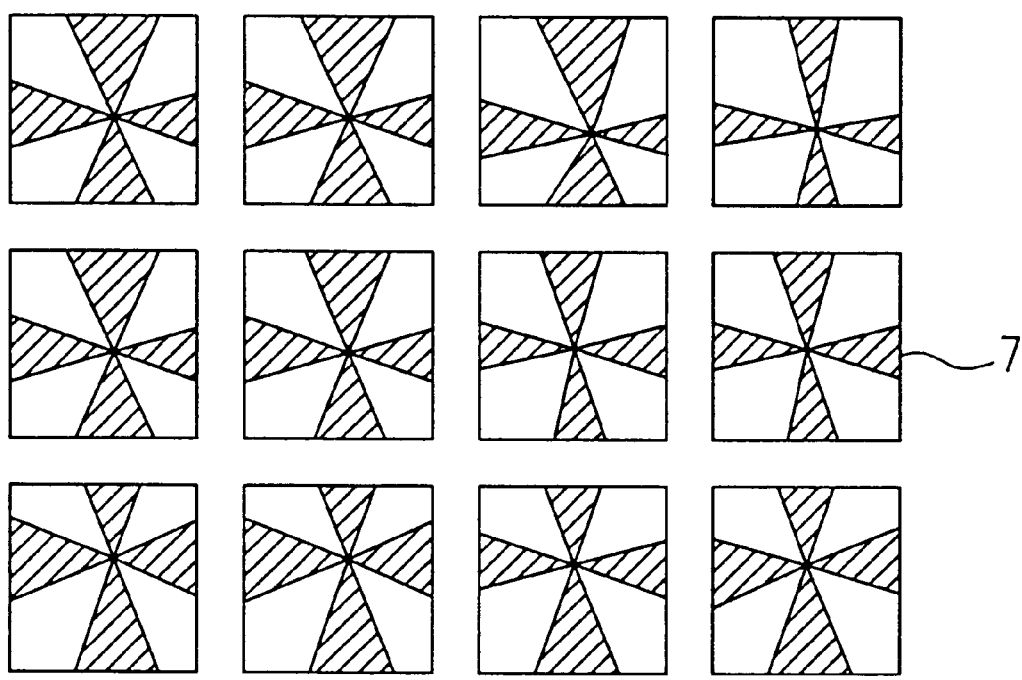
FIG. 2 is a schematic plan view of a pixel in a liquid crystal cell produced in Example 1 according to the present invention when observed in a crossed-Nicols state with a polarizing microscope.

Observations of the liquid crystal phase in a transmissive mode with a polarizing microscope show that in the case where a voltage applied is in the range of 1.5 to 2.5 V, an extinction pattern 7 is formed as shown in FIG. 2 and that the liquid crystal molecules are axis-symmetrically oriented in almost all of the pixel regions. The magnitudes of the voltages applied and the resultant rates of the axis-symmetrical orientation in the liquid crystal regions (i.e., number of liquid crystal regions having the axis-symmetrical orientation/total number of liquid crystal regions represented in percentage) are shown in Table 1.

TABLE 1

| Voltage applied (V) | 0 | 1.5 | 2 | 2.5 | 3 | 5 |
|---|---|---|---|---|---|---|
| Axis-symmetrical orientation rate (%) | 3 | 93 | 80 | 91 | 51 | 13 |

As is clear from the results shown in Table 1, almost no axis-symmetrical orientation is obtained when no voltage is applied. It is also clear that an application of an excessively large voltage results in a decrease in the axis-symmetrical orientation rate. A possible reason for this is that when a voltage which is close to a saturation voltage is applied, the liquid crystal molecules stand substantially perpendicular to the substrates, which makes the axis-symmetrical orientation unstable. The optimal frequency and magnitude of the voltage to be applied depend on the kind of precursor material, the distance between the substrates and the size of the pixel region (i.e., liquid crystal region), and can be selected appropriately.

After forming the liquid crystal droplet having the axis-symmetrical orientation in each pixel region according to the above-mentioned process, both of the electrodes provided on the pair of substrates are short-circuited outside the substrates to prevent a voltage from being applied to the liquid crystal layer. Then, the liquid crystal layer is irradiated with ultraviolet radiation for 120 seconds (exposure energy: 0.48 J/cm²). This is followed by an application of an AC voltage having an effective value of 2.5 V (60 Hz) to the liquid crystal layer and a simultaneous irradiation with ultraviolet radiation for 120 seconds (exposure energy: 0.48 j/cm²). The liquid crystal layer is further irradiated with ultraviolet radiation for 2400 seconds (exposure energy: 9.6 J/cm²) to obtain the liquid crystal display device 200 shown in FIG. 14.

The obtained liquid crystal display device 200 has the axis-symmetrically oriented liquid crystal regions 59, and exhibits excellent viewing angle characteristics.

Example 2

Figure 3A:
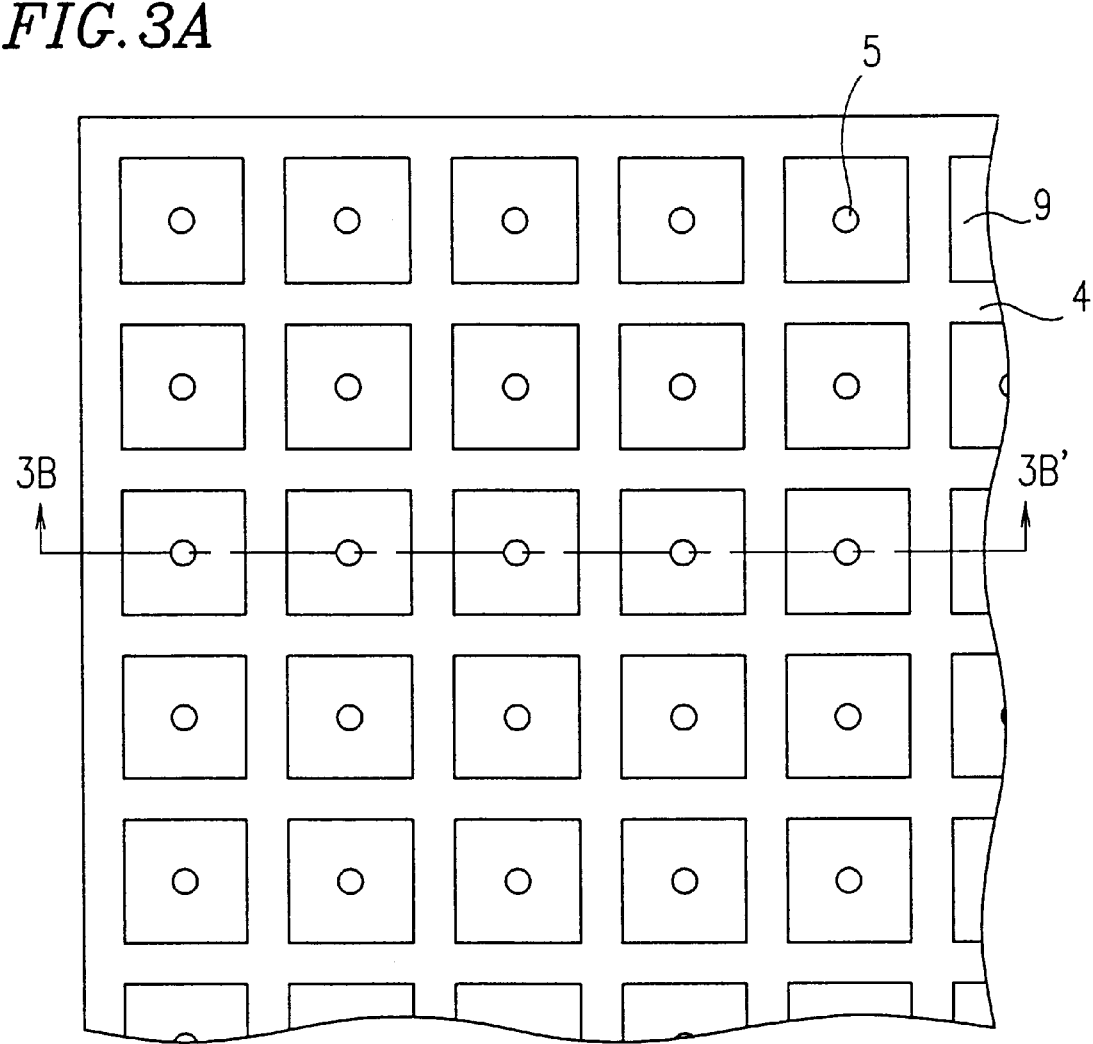
FIG. 3A is a plan view of a substrate in a liquid crystal display device produced in Example 2 according to the present invention.
Figure 3B:
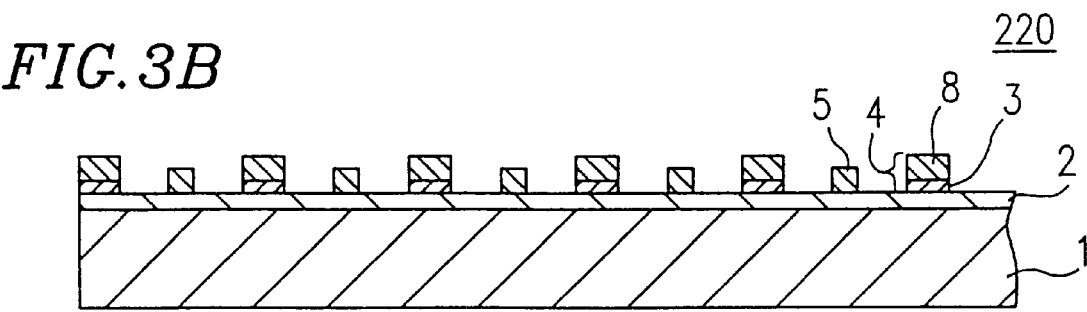
FIG. 3B is a cross-sectional view of the substrate shown in FIG. 3A taken along the line 3B–3B'.

On a glass substrate (thickness: about 1.1 mm) having thereon a transparent electrode (thickness: about 100 nm) formed of ITO, a sealing compound (e.g., STRUCT BOND XN-21S manufactured by MITSUI TOATSU CHEMICALS INC.) is patterned using a printing method to form a first substrate (not shown). Then, as shown in FIGS. 3A and 3B, a black matrix 3 (thickness: about 300 nm) which is formed of molybdenum and has an opening 9 having a size of about 200 μm×200 μm, is patterned on a glass substrate 1 (thickness: about 1.1 mm) having thereon a transparent electrode 2 formed of ITO (thickness: about 100 nm). To the resultant substrate, a negative-type photoresist (e.g., OMR83 manufactured by Tokyo Ohka Kogyo Co., Ltd.) is applied. The resultant substrate is exposed to light under a prescribed mask, developed, rinsed and baked to form a projection 8 and an island-like projection 5, both having a height of 3 μm. In Example 2, the black matrix 3 and the projection 8 together constitute a projection-like structure 4. The projection-like structure 4 controls a region where liquid crystal droplets are formed to correspond to a region surrounded by the projection-like structure 4 (i.e., opening 9). Furthermore, formation of the center axis of the axis-symmetrical orientation in a position corresponding to the island-like projection 5 formed in the center portion of the pixel region is facilitated.

Plastic beads having a particle diameter of 6.0 μm (e.g., Micropearl manufactured by Sekisui Fine Chemical Co., Ltd.) are scattered on the resultant substrate to form a second substrate 220. The second substrate 220 is attached to the first substrate to form a cell (distance between the first substrate and the second substrate 220: 6.0 μm).

As a liquid crystal material, 3.74 g of ZL-4792 (manufactured by Merck & Co., Inc.; containing 0.4 wt % of chiral dopant S-811) is usable. As a polymerizable resin material, a mixture of 0.1 g of R-684 (manufactured by Nippon Kayaku Co., Ltd.), 0.1 g of p-phenylstyrene, and 0.06 g of compound A represented by formula (I) above is usable. As a photopolymerization initiator, 0.02 g of Irgacure 651 (manufactured by Ciba-Geigy Corporation) is usable. The above-mentioned liquid crystal material, polymerizable resin material and photopolymerization initiator are mixed sufficiently to obtain a precursor mixture. The miscible temperature of the precursor mixture is 72° C.

The precursor mixture is injected into the cell to obtain a liquid crystal cell. The liquid crystal cell is first heated to 100° C. to turn the precursor mixture into a uniform isotropic phase. Then, the temperature is lowered at a temperature lowering rate of 0.3° C./min while applying a square-wave AC signal voltage having a voltage of 5 V and a frequency of 60 Hz to the precursor mixture in the liquid crystal cell in order to separate liquid crystal droplets and to cause the separated liquid crystal droplets to grow into one liquid crystal droplet. The liquid crystal droplet is caused to grow further to the size of the pixel region.

Figure 4:
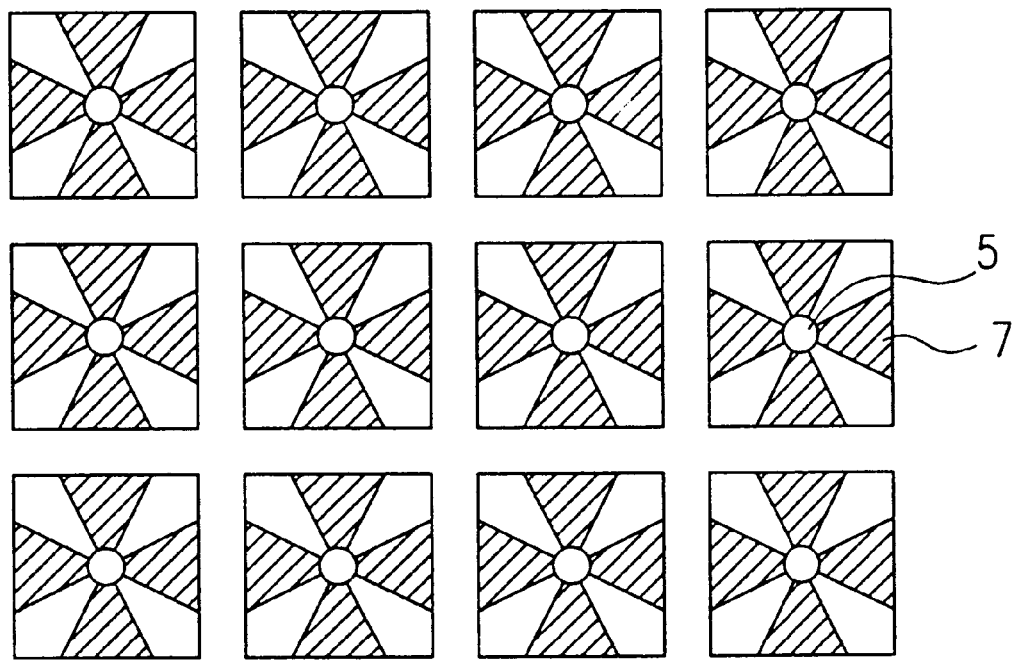
FIG. 4 is a schematic plan view of a pixel in a liquid crystal cell produced in Example 2 according to the present invention when observed in a crossed-Nicols state with a polarizing microscope.

Observations of the liquid crystal phase in a transmissive mode with a polarizing microscope show that the liquid crystal molecules are axis-symmetrically oriented in the pixel regions and that at the same time, the position of the symmetry axis is stabilized in a position corresponding to the island-like projection 5 formed in the center portion of the pixel region as shown in FIG. 4.

Next, the liquid crystal display device 200 is completed according to the process described in Example 1. The obtained liquid crystal display device 200 has the axis-symmetrically oriented liquid crystal regions 59, and exhibits excellent viewing angle characteristics.

Example 3

Figure 5A:
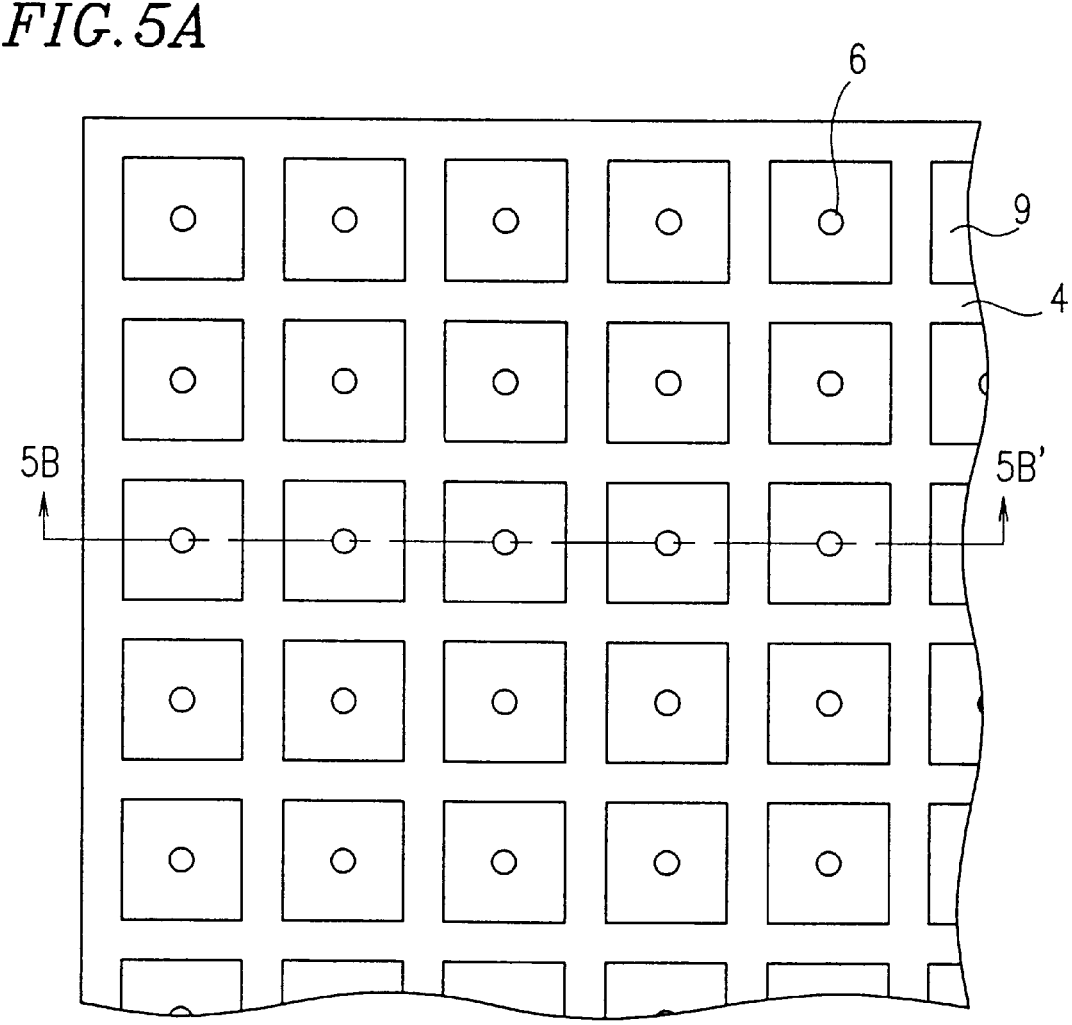
FIG. 5A is a plan view of a substrate in a liquid crystal display device produced in Example 3 according to the present invention.
Figure 5B:
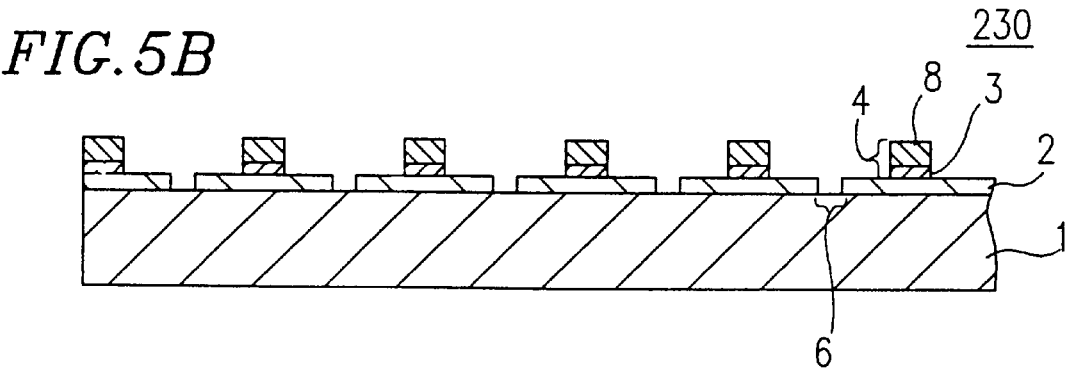
FIG. 5B is a cross-sectional view of the substrate shown in FIG. 5A taken along the line 5B–5B'.

On a glass substrate (thickness: about 1.1 mm) having thereon a transparent electrode (thickness: about 100 nm) formed of ITO, a sealing compound (e.g., STRUCT BOND XN-21S manufactured by MITSUI TOATSU CHEMICALS INC.) is patterned using a printing method to form a first substrate (not shown). Then, as shown in FIGS. 5A and 5B, a black matrix 3 which is formed of molybdenum and has an opening 9 having a size of about 200 μm×200 μm, is patterned on a glass substrate 1 (thickness: about 1.1 mm) having thereon a transparent electrode 2 formed of ITO (thickness: about 100 nm). The ITO is removed from the center portion of the pixel region by photolithography and etching to form a region with no electrode 6. To the resultant substrate, a negative-type photoresist (e.g., OMR83 manufactured by Tokyo Ohka Kogyo Co., Ltd.) is applied. The resultant substrate is exposed to light, developed, rinsed and baked to form a projection 8 having a height of 3 μm. Plastic beads having a particle diameter of 6.0 μm (e.g., Micropearl manufactured by Sekisui Fine Chemical Co., Ltd.) are scattered on the resultant substrate to form a second substrate 230. The second substrate 230 is attached to the first substrate to form a cell.

As a liquid crystal material, 3.74 g of ZL-4792 (manufactured by Merck & Co., Inc.; containing 0.4 wt % of chiral dopant S-811) is usable. As a polymerizable resin material, a mixture of 0.1 g of R-684 (manufactured by Nippon Kayaku Co., Ltd.), 0.1 g of p-phenylstyrene, and 0.06 g of compound A represented by formula (I) above is usable. As a photopolymerization initiator, 0.02 g of Irgacure 651 (manufactured by Ciba-Geigy Corporation) is usable. The above-mentioned liquid crystal material, polymerizable resin material and photopolymerization initiator are mixed sufficiently to obtain a precursor mixture. The miscible temperature of the precursor mixture is 72° C.

The precursor mixture is injected into the cell to obtain a liquid crystal cell. The liquid crystal cell is first heated to 100° C. to turn the precursor mixture into a uniform isotropic phase. Then, the temperature is lowered at a temperature lowering rate of 0.3° C./min while applying a square-wave AC signal voltage having a voltage of 5 V and a frequency of 60 Hz to the precursor mixture in the liquid crystal cell in order to separate liquid crystal droplets and to cause the separated liquid crystal droplets to grow into one liquid crystal droplet. The liquid crystal droplet is caused to grow further to the size of the pixel region.

Figure 11:
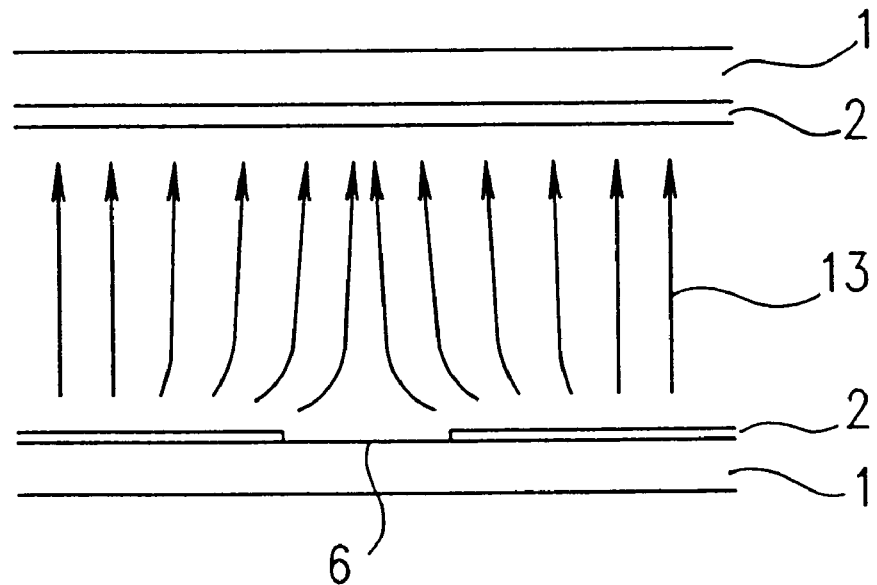
FIG. 11 is a cross-sectional view of a liquid crystal cell using the substrate shown in FIGS. 5A and 5B when a voltage is applied thereto, schematically illustrating an electric field distribution state thereof.
Figure 12:
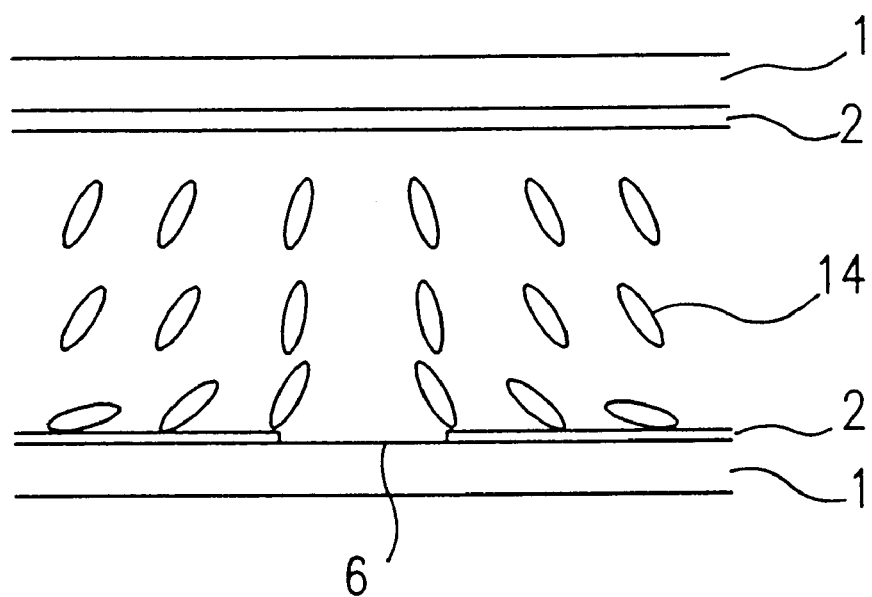
FIG. 12 is a cross-sectional view of a liquid crystal cell using the substrate shown in FIGS. 5A and 5B when a voltage is applied thereto, schematically illustrating an orientation state of the liquid crystal molecules therein.
Figure 13:
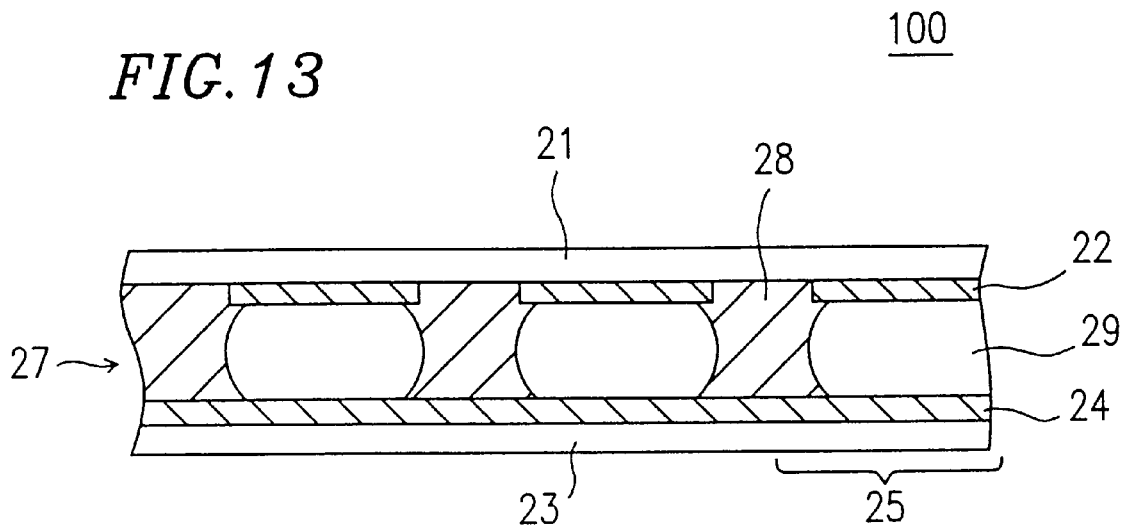
FIG. 13 is a partial cross-sectional view of a conventional liquid crystal display device having a liquid crystal region in which liquid crystal molecules are axis-symmetrically oriented.

The electric field distribution and the orientation state of the liquid crystal molecules inside the liquid crystal layer when a voltage is applied to the liquid crystal cell having the substrate 230 shown in FIG. 5B are shown schematically in FIGS. 11 and 12 respectively. As shown in FIG. 11, electric force lines 13 tilt axis-symmetrically with respect to a line passing through the region with no electrode 6 and which is substantially normal to the substrates 1. As a result, liquid crystal molecules 14 are axis-symmetrically oriented with respect to the line passing through the region with no electrode 6 and which is substantially normal to the substrates 1 as shown in FIG. 12.

Figure 6:
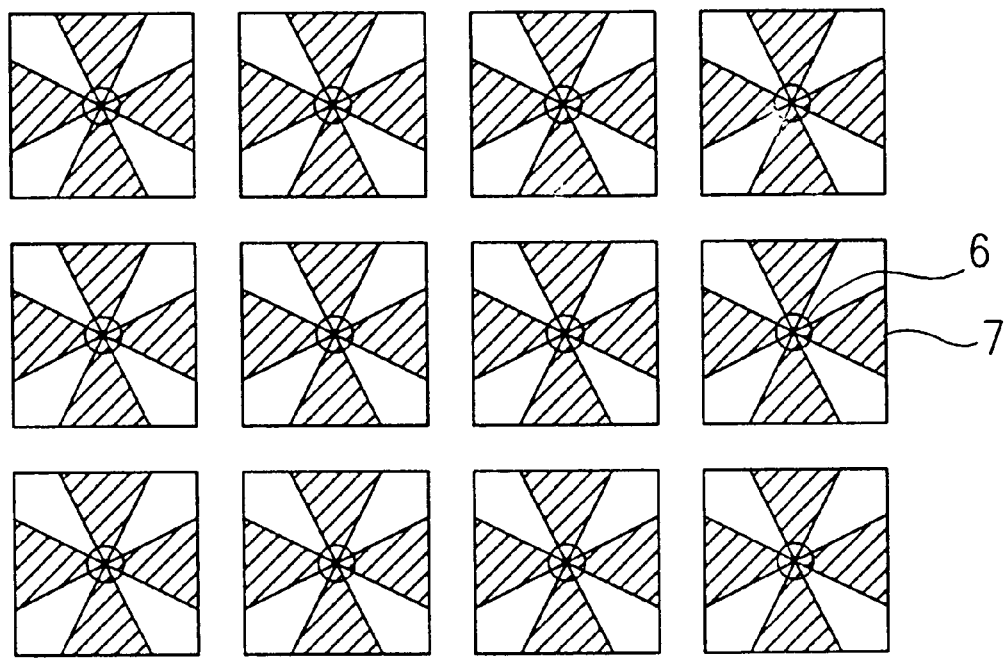
FIG. 6 is a schematic plan view of a pixel in a liquid crystal cell produced in Example 3 according to the present invention when observed in a crossed-Nicols state with a polarizing microscope.
Figure 7A:
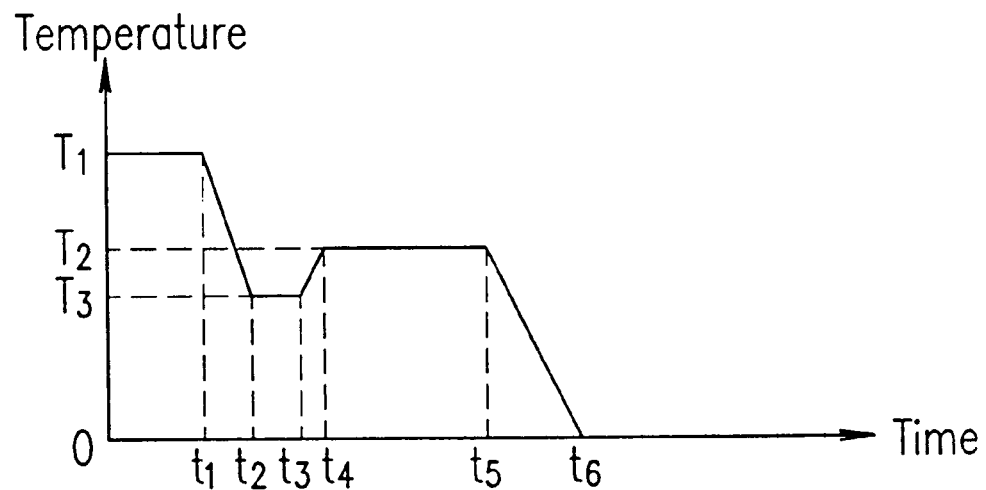
FIG. 7A is a graph illustrating temperature manipulation conditions required by a conventional method for producing a liquid crystal display device.
Figure 7B:
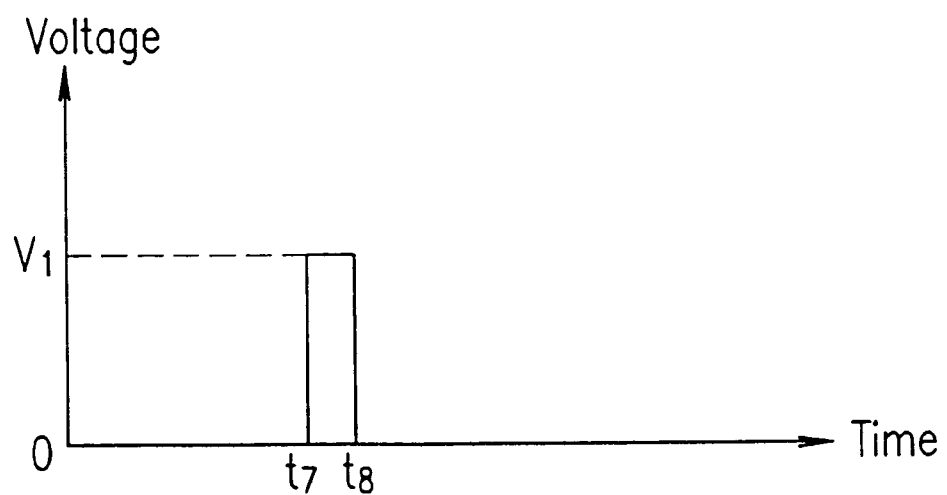
FIG. 7B is a graph illustrating voltage application conditions required by a conventional method for producing a liquid crystal display device.
Figure 8A:
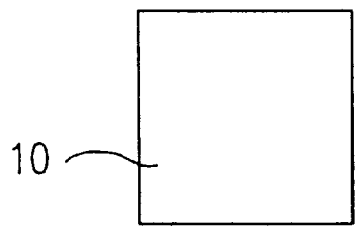
FIG. 8A is a schematic plan view of a pixel in the first stage of a growth process according to a conventional method for producing a liquid crystal display device.
Figure 8B:
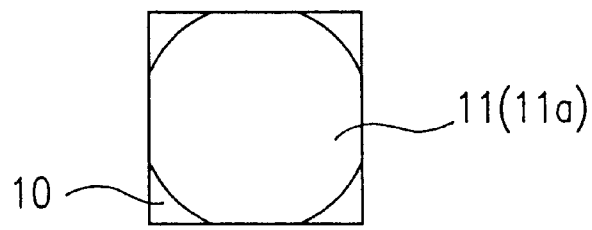
FIG. 8B is a schematic plan view of a pixel in the second stage of a growth process according to a conventional method for producing a liquid crystal display device.
Figure 8C:
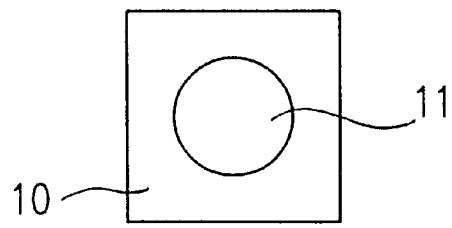
FIG. 8C is a schematic plan view of a pixel in the third stage of a growth process according to a conventional method for producing a liquid crystal display device.
Figure 8D:
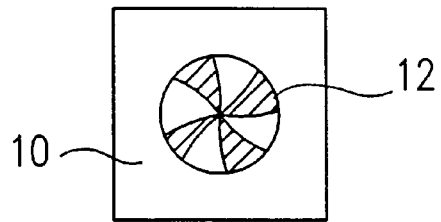
FIG. 8D is a schematic plan view of a pixel in the fourth stage of a growth process according to a conventional method for producing a liquid crystal display device.
Figure 8E:
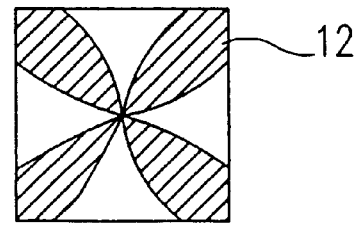
FIG. 8E is a schematic plan view of a pixel in the fifth stage of a growth process according to a conventional method for producing a liquid crystal display device.

Observations of the liquid crystal phase in a transmissive mode with a polarizing microscope show that the liquid crystal molecules are axis-symmetrically oriented in the pixel regions and that at the same time, the position of the symmetry axis is stabilized in a region corresponding to the region with no electrode 6 formed in the center portion of the pixel region as shown in FIG. 6.

According to the present invention, the method for producing a liquid crystal display device in which liquid crystal molecules or a mixture containing liquid crystal molecules are axis-symmetrically oriented can realize an establishment of a stable axis-symmetrical orientation in almost all pixels (i.e., liquid crystal regions). This makes it possible to produce a high yield of liquid crystal display devices of excellent display quality. The production method according to the present invention is preferably employed for producing a liquid crystal display device having wide viewing angle characteristics.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display device including a pair of substrates and a liquid crystal layer held between the pair of substrates, wherein the liquid crystal layer includes a polymeric region and a liquid crystal region substantially surrounded by the polymeric region, and liquid crystal molecules in the liquid crystal region are axis-symmetrically oriented, the method comprising the steps of:

injecting a precursor mixture containing a liquid crystal material and a polymerizable material between the pair of substrates;

heating the precursor mixture to a first temperature which is equivalent to or higher than a miscible temperature of the precursor mixture;

cooling the precursor mixture from the first temperature to a second temperature which is lower than the miscible temperature;

forming the polymeric region substantially surrounding the liquid crystal region by polymerizing the polymerizable material; and providing a tilt angle to the liquid crystal molecules in a liquid crystal droplet phase-separated from the precursor mixture by continuously applying a prescribed external field to the precursor mixture at least while the precursor mixture is being cooled from the miscible temperature to the second temperature.

2. A method for producing a liquid crystal display device according to claim 1, wherein the pair of substrates include electrodes on opposing surfaces thereof, and the external field is applied to the precursor mixture by applying a voltage across the electrodes.

3. A method for producing a liquid crystal display device according to claim 1, wherein at least one of the pair of substrates includes a projection-like structure surrounding a plurality of pixel regions on a surface which faces the liquid crystal layer, and the method further comprises the step of causing the liquid crystal droplet phase-separated from the precursor mixture to aggregate in each of the plurality of pixel regions surrounded by the projection-like structure in the step of cooling.

4. A method for producing a liquid crystal display device according to claim 3, wherein at least one of the pair of substrates further includes an island-like projection in a center portion of each of the plurality of pixel regions on the surface which faces the liquid crystal layer, and the method further comprises the step of forming a center axis of an axis-symmetrical orientation of the liquid crystal droplet phase-separated from the precursor mixture at a position corresponding to the island-like projection in the step of cooling.

5. A method for producing a liquid crystal display device according to claim 4, wherein an area occupied by the island-like projection is between 2% and 50% inclusive of the pixel region.

6. A method for producing a liquid crystal display device according to claim 3, wherein the pair of substrates include an electrode for applying a voltage to the liquid crystal layer, at least one of the pair of substrates includes a region with no electrode in the center portion of each of the plurality of pixel regions on the surface which faces the liquid crystal layer, and the method further comprises the step of forming a center axis of an axis-symmetrical orientation of the liquid crystal droplet phase-separated from the precursor mixture at a position corresponding to the region with no electrode in the step of cooling.

7. A method for producing a liquid crystal display device according to claim 6, wherein an area occupied by the region with no electrode is between 2% and 50% inclusive of the pixel region.

8. A method for producing a liquid crystal display device according to claim 1, wherein the precursor mixture is cooled at a temperature lowering rate of 5° C./min or lower in the cooling step.

9. A method for producing a liquid crystal display device according to claim 1, wherein the external field applied to the precursor mixture is an AC voltage having a voltage value of 1 V or higher and a frequency of 1 Hz or higher.

\* \* \* \* \*